United States Patent [19]
Thomas et al.

[11] Patent Number: 5,460,317
[45] Date of Patent: Oct. 24, 1995

[54] FRICTION WELDING

[75] Inventors: Wayne M. Thomas; Edward D. Nicholas, both of Haverhill; James C. Needham, Saffron Walden; Michael G. Murch, Herts; Peter Temple-Smith, Cambridge; Christopher J. Dawes, Cambs, all of United Kingdom

[73] Assignee: The Welding Institute, Cambridge, United Kingdom

[21] Appl. No.: 244,612
[22] PCT Filed: Nov. 27, 1992
[86] PCT No.: PCT/GB92/02203
§ 371 Date: Aug. 1, 1994
§ 102(e) Date: Aug. 1, 1994
[87] PCT Pub. No.: WO93/10935
PCT Pub. Date: Jun. 10, 1993

[30] Foreign Application Priority Data

Dec. 6, 1991 [GB] United Kingdom ............... 9125978

[51] Int. Cl.⁶ .................................................. B23K 20/12
[52] U.S. Cl. ............................ 228/112.1; 228/114.5; 228/119
[58] Field of Search .................... 228/112.1, 114.5, 228/114, 119, 189, 234.1, 2.1; 156/73.5

[56] References Cited

U.S. PATENT DOCUMENTS

| 3,949,896 | 4/1976 | Luc | 228/112.1 |
| 4,144,110 | 3/1979 | Luc | 156/73.5 |

FOREIGN PATENT DOCUMENTS

| 1233978 | 5/1986 | U.S.S.R. | 228/112.1 |
| 1393566 | 5/1988 | U.S.S.R. | 228/112.1 |
| 572789 | 10/1945 | United Kingdom . | |
| 2270864 | 3/1994 | United Kingdom | 228/112.1 |

OTHER PUBLICATIONS

Patent Abstracts of Japan, vol. 6, No. 253 (M–178), Dec. 11, 1982, 57149082.
Patent Abstracts of Japan, vol. 10, No. 388 (M–549), Dec. 26, 1986, 61176484.
Derwent Publications, 89–199319/27, 16 Aug. '89, SU 1433–522A.
Derwent Publication, 88–203819/29, 23 Jun. '88, SU 1362 593A.

Primary Examiner—Samuel M. Heinrich
Attorney, Agent, or Firm—Martin M. Novack

[57] ABSTRACT

A method of operating on a workpiece comprises offering a probe of material harder than the workpiece material to a continuous surface of the workpiece causing relative cyclic movement between the probe and the workpiece while urging the probe and workpiece together whereby frictional heat is generated as the probe enters the workpiece so as to create a plasticized region in the workpiece material around the probe, stopping the relative cyclic movement, and allowing the plasticized material to solidify around the probe. This technique, which we refer to as "friction plunge welding" provides a very simple method of joining a probe to a workpiece. The method can be used for repairing cracks and the like within a workpiece or for joining members, such as studs or bushes, to a workpiece. Another aspect of the invention comprises causing a probe of material harder than the workpiece material to enter the joint region and opposed portions of the workpieces on either side of the joint region while causing relative cyclic movement between the probe and the workpieces whereby frictional heat is generated to cause the opposed portions to take up a plasticized condition, removing the probe, and allowing the plasticized portions to solidify and join the workpieces together. This technique, which we refer to as "friction stir butt welding" enables a wide variety of workpieces to be joined using a "non-consumable" probe without the problems of oxidation and the like.

12 Claims, 11 Drawing Sheets

FRICTION WELDING

The invention relates to friction welding, for joining two workpieces or for operating on a workpiece, for example to repair a crack or join a member to a workpiece.

Friction welding has been known for many years and typically involves causing relative movement between a pair of workpieces while they are urged together so as to generate a plasticised region, stopping the relative movement and allowing the plasticised region to solidify thereby joining the workpieces.

It has also been proposed in the past to join workpieces by making use of a "non-consumable" member which does not form part of the finished joint. An example of this approach is shown in U.S. Pat. No. 4,144,110 in which the two workpieces are urged together about a rotating wheel which causes the plasticised region to be generated. The two workpieces are also translated relative to the wheel so that they are welded together along a joint region. Similar techniques for welding straight-seamed metal pipes are disclosed in SU-A-1433522 and SU-A-1362593. The problem in all these cases is that the zone which is heated is displaced from the point at which the workpieces or sides of the pipe are urged together with the result that such techniques would need to be carried out in carefully controlled atmospheres to prevent oxidation of the plasticised region in for example aluminum.

JP-A-61176484 discloses a technique using "consumable" spinning plugs which are positioned between opposed faces of the workpieces and cause the generation of plasticised regions within the workpieces and within themselves so that as the workpieces are urged together the spinning plugs are accumulated into the plasticised region and thereby form part of the resulting joint. This is a complex procedure requiring the ability to rotate a multitude of spinning plugs and to ensure that the plug material is compatible with the material of the workpieces.

In accordance with one aspect of the present invention, a method of operating on a workpiece comprises offering a probe of material harder than the workpiece material to a continuous or substantially continuous surface of the workpiece; causing relative cyclic movement between the probe and the workpiece while urging the probe and workpiece together whereby frictional heat is generated as the probe enters the workpiece so as to create a plasticised region in the workpiece material around the probe; stopping the relative cyclic movement; and allowing the plasticised material to solidify around the probe.

This new technique, which we refer to as "friction plunge welding" provides a very simple method of joining a probe to a workpiece. The method can be used for repairing cracks and the like within a workpiece or for joining members, such as studs or bushes, to a workpiece.

Preferably, at least part of the probe which enters the workpiece is shaped, for example tapered, so as to key into the solidified material.

This technique can be extended more generally to the joining of workpieces or the joining of opposed sides of a workpiece in for example pipes and cracked materials and the like. Thus, in accordance with a second aspect of the present invention, a method of joining workpieces defining a joint region therebetween comprises causing a probe of material harder than the workpiece material to enter the joint region and opposed portions of the workpieces on either side of the joint region while causing relative cyclic movement between the probe and the workpieces whereby frictional heat is generated to cause the opposed portions to take up a plasticised condition; removing the probe; and allowing the plasticised portions to solidify and join the workpieces together.

This technique, which we refer to as "friction stir butt welding" enables a wide variety of workpieces to be joined using a "non-consumable" probe without the problems of the prior art mentioned above. In particular, the workpieces will not normally be urged towards each other but simply restrained against movement away from the joint region during passage of the probe. The probe plasticises the portions of the workpieces immediately adjacent the probe so that upon removal or translation of the probe these regions will immediately coalesce and solidify. The problems of oxidation and the like are thereby avoided.

This method can be used to join workpieces along a common plane, as in butt joints by heating and disrupting a local zone formed between the components such that on cooling a common bond is established as the local active zone is translated along the joint. In particular the method generally results in a mix of the two abutting surfaces, often at temperatures below the true melting point of the materials to be joined.

The materials can be metals, alloys or compound materials such as MMC, or suitable plastic materials such as thermo-plastics.

In some cases, the workpieces are joined at spaced locations along the joint region, the probe being withdrawn from one point, traversed to the next point and then reinserted between the workpieces. Preferably, when the joint region has an elongate dimension extending laterally between the workpieces, the method further comprises causing relative translational movement between the workpieces and the probe in the direction of the joint region.

In one example of the method a substantially non-consumable probe is inserted between the materials to be joined in say a butt joint configuration and rotated to produce frictional heating. With sufficient heating a layer of plasticised material is formed around the probe generally composed of both materials to be joined, such that on slowly traversing the rotating probe along the joint line, the plasticised material is spread along the joint. On cooling, the plasticised material bonds the components together as desired.

In some examples, the probe has an elongate axis and undergoes cyclic movement, for example a reciprocating movement, in a direction generally parallel with its elongate axis. Depending upon the method, the probe can then either be moved to allow the workpieces to be joined together or can be left in situ.

In all these methods, the probe may have a substantially circular cross-section.

In another example the probe is in the form of a slightly tapering cylinder so that it may be inserted from one side of the joint, forming a plasticised layer to the depth of penetration of the probe.

In yet another example, a probe blade is reciprocated in the through thickness direction to produce heating of the joint such that on traversing along the joint line the plasticised material passes around the blade and on cooling consolidates the joint.

Preferably the plasticised material is restrained from extruding from the joint region, for example by a suitable cap or shoe which closely fits the workpiece surface. In a further example of the probe method, the probe may be heated prior to frictioning by other means such as electric resistance (Joule) heating. In the latter case the probe may conveniently take the form of a thin blade or knife which is pressed into the joint line forming heated or plasticised material from the material of the components to be joined by frictioning as described above. This again on cooling bonds the components along their common joint line.

One advantage of the method according to the invention is that the depth of operation, and hence the depth of suitably heated or plasticised material is accurately controlled and known in advance.

Another advantage is that the butting surfaces are directly acted on by the probe, and that lack of bond defects (flat spots) on the joint faces are inherently minimised or prevented.

A further advantage of the method according to the invention is that a given tool can be utilised for long seams without limit, and that relatively deep joints can be made in one pass.

Some examples of methods according to the invention will now be described with reference to the accompanying drawings, in which.

Figure 5:
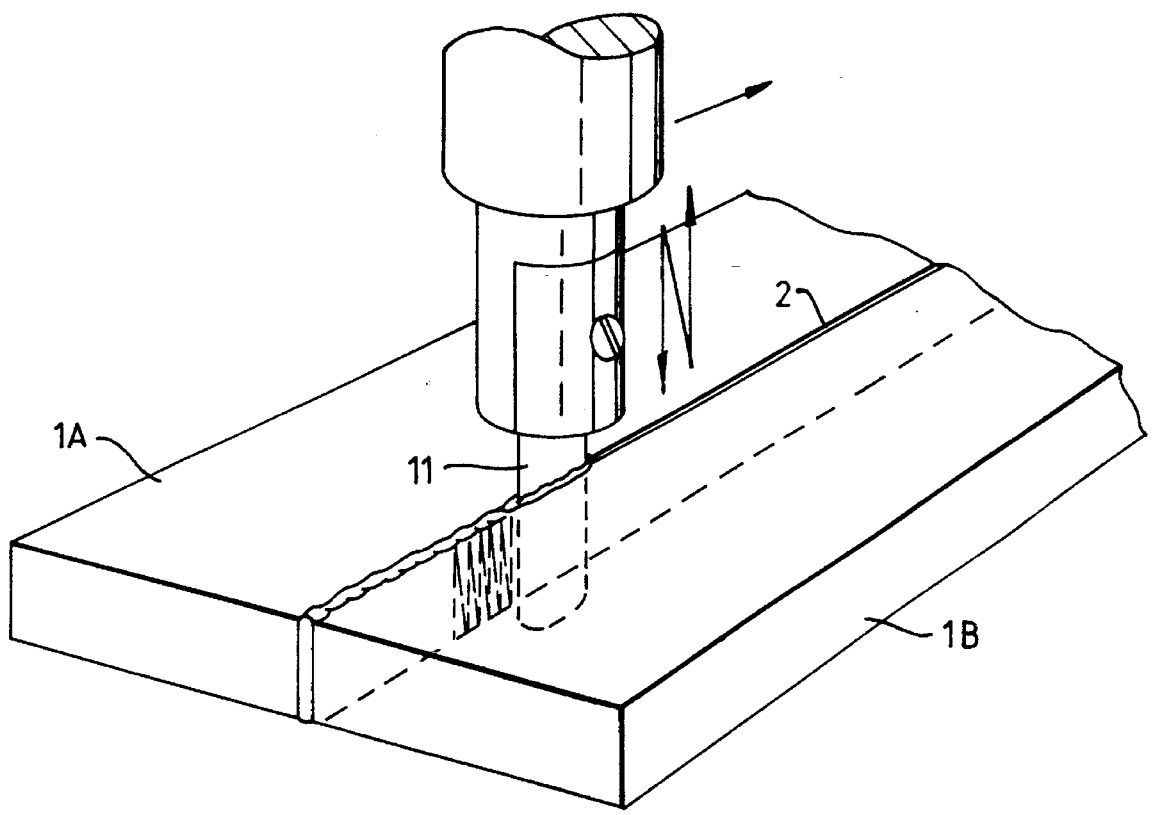
FIG. 5 is an isometric view illustrating a second method.
Figure 6A:
Figure 7:
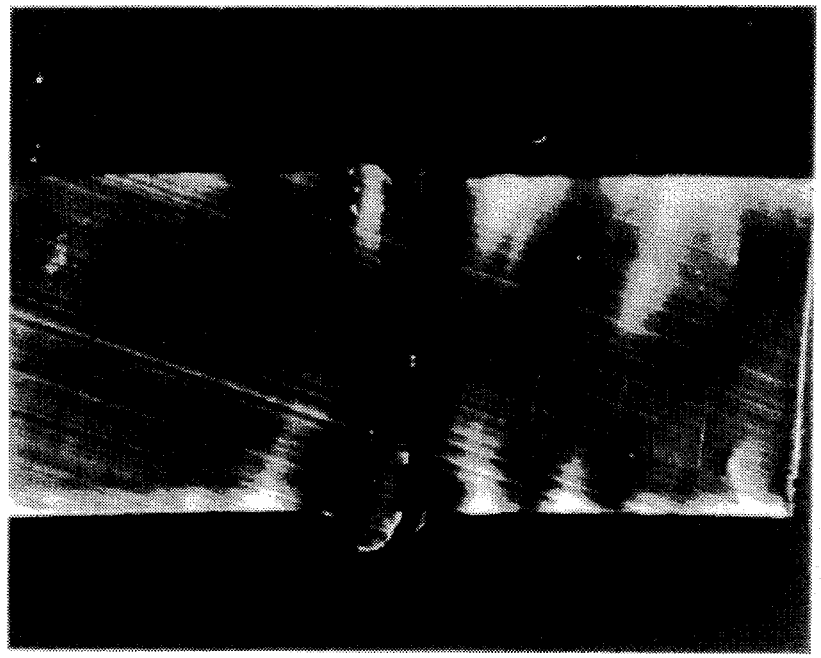
Figure 8:
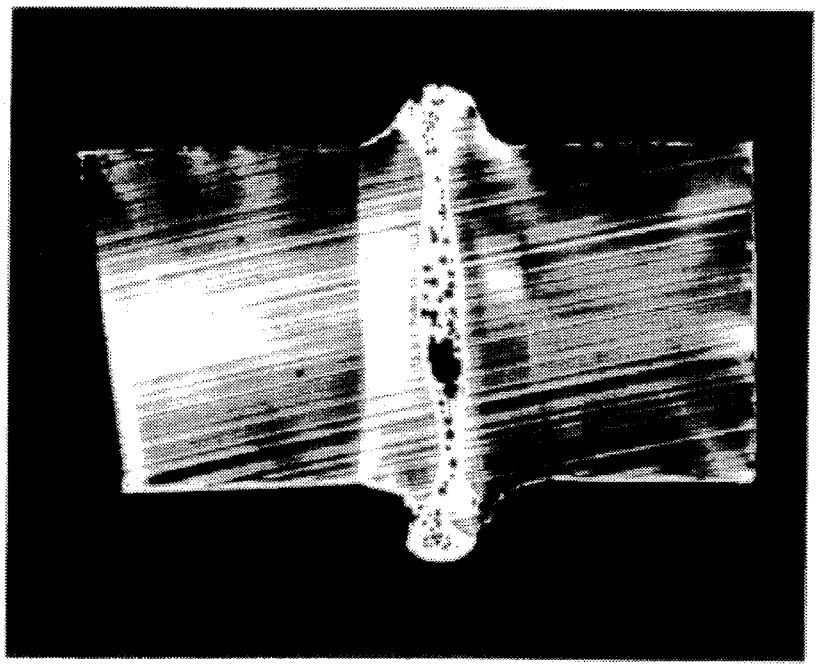
Figure 9A:
Figure 9B:
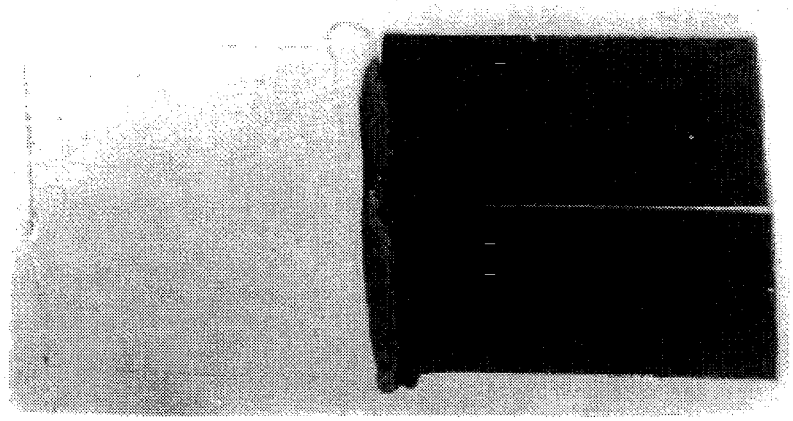
Figure 9C:
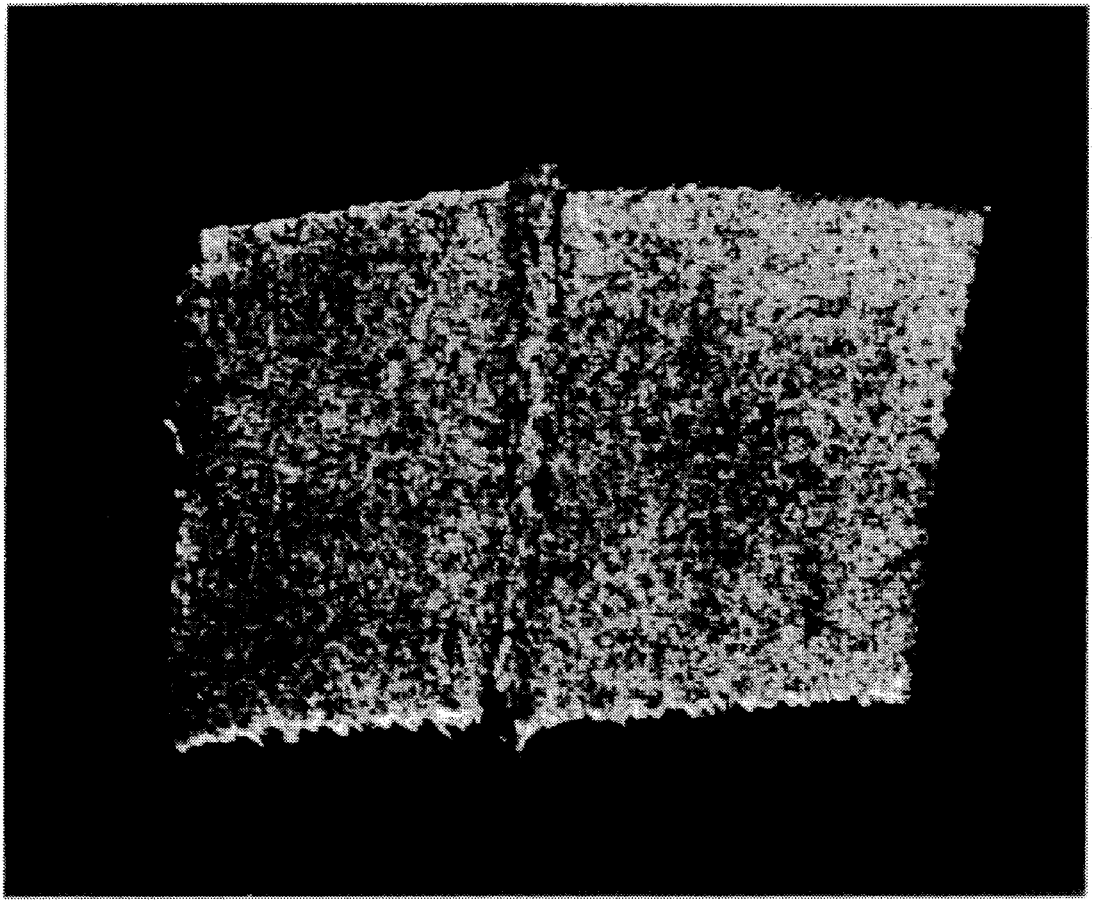
Figure 10A:
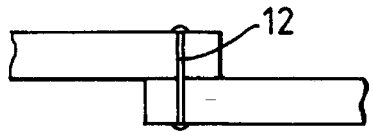
Figure 10B:
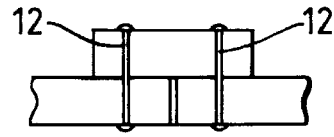
Figure 10C:
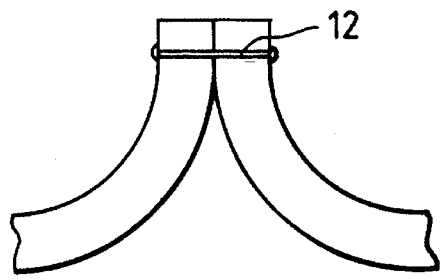
Figure 11:
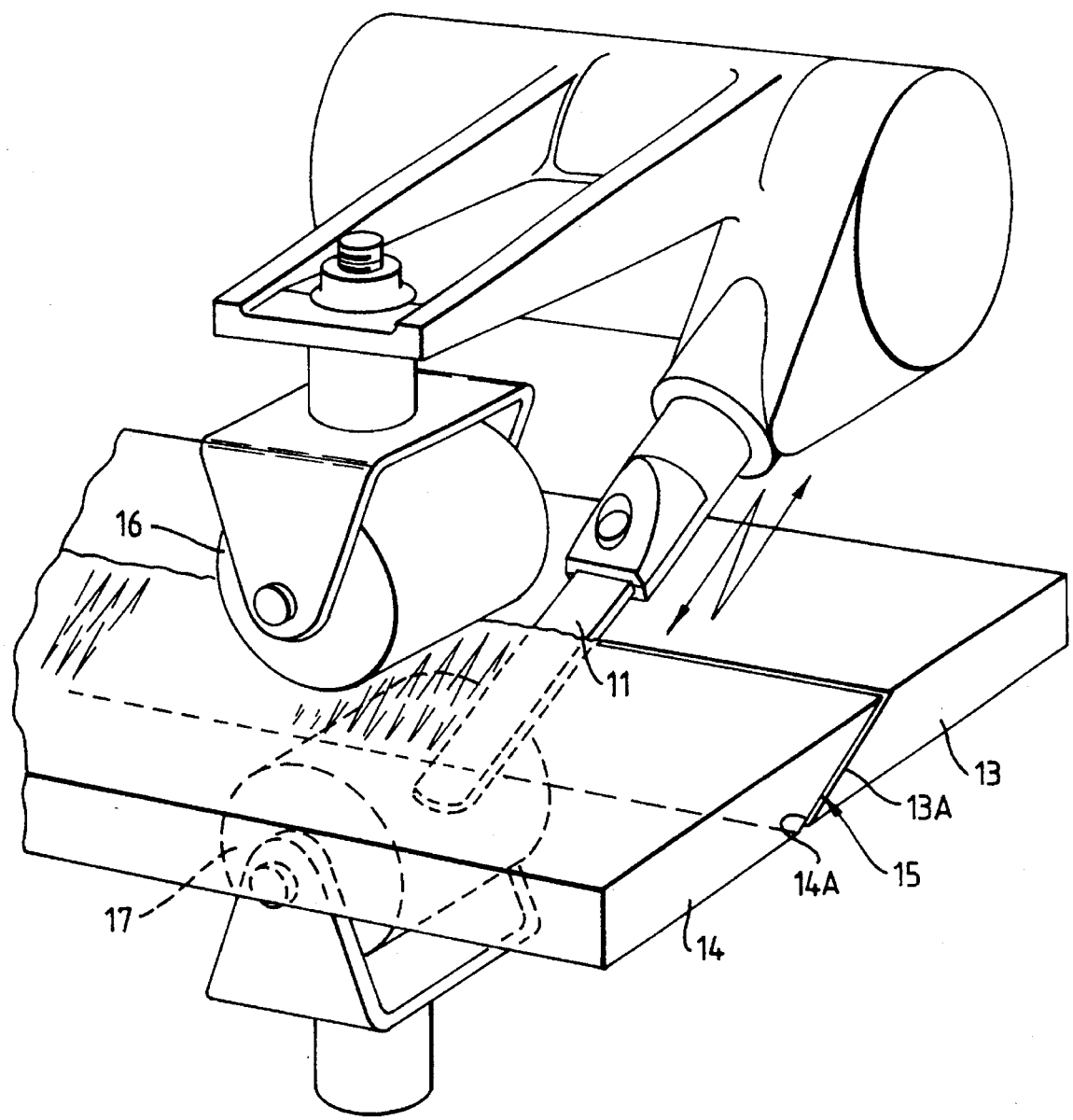
Figure 12A:
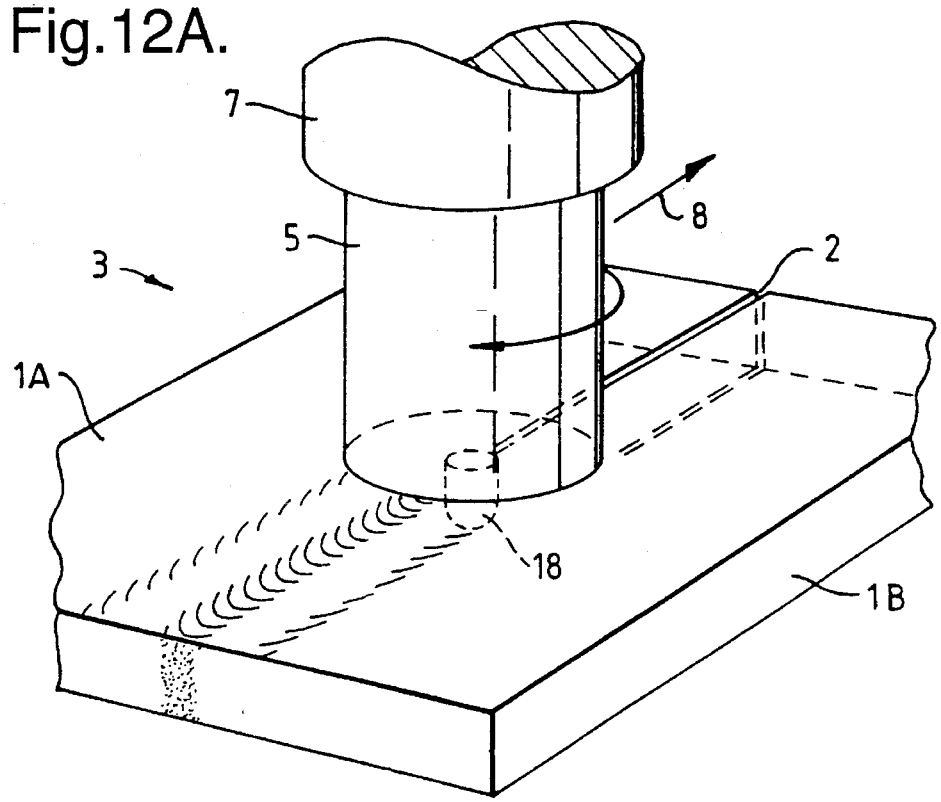
Figure 12B:
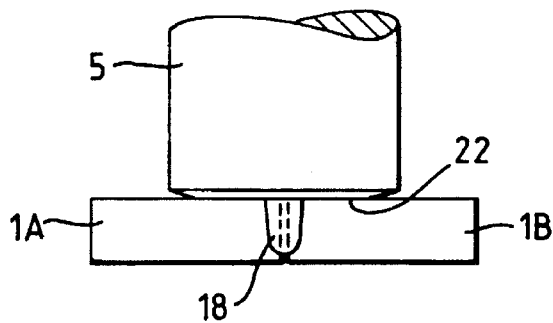
Figure 12C:
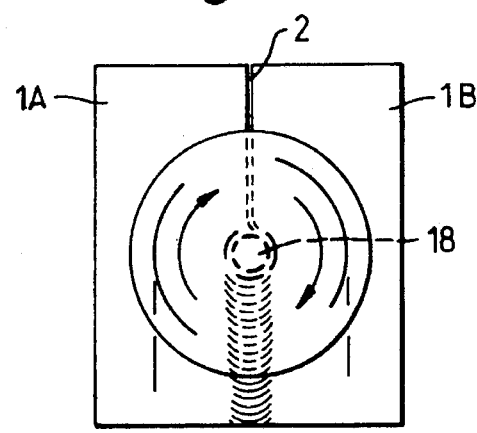
Figure 13A:
Figure 14A:
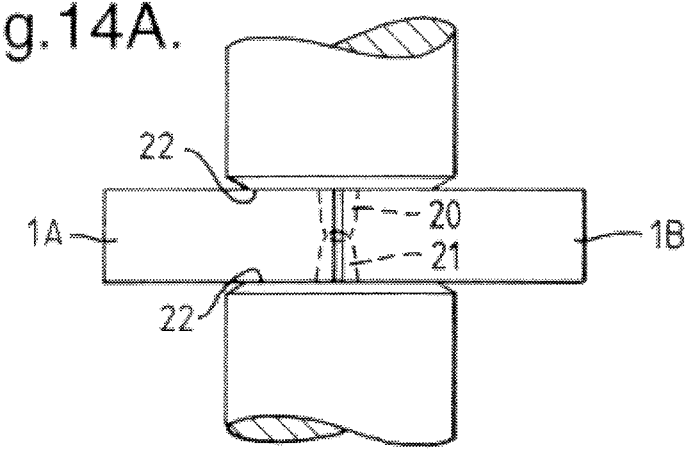
Figure 14B:
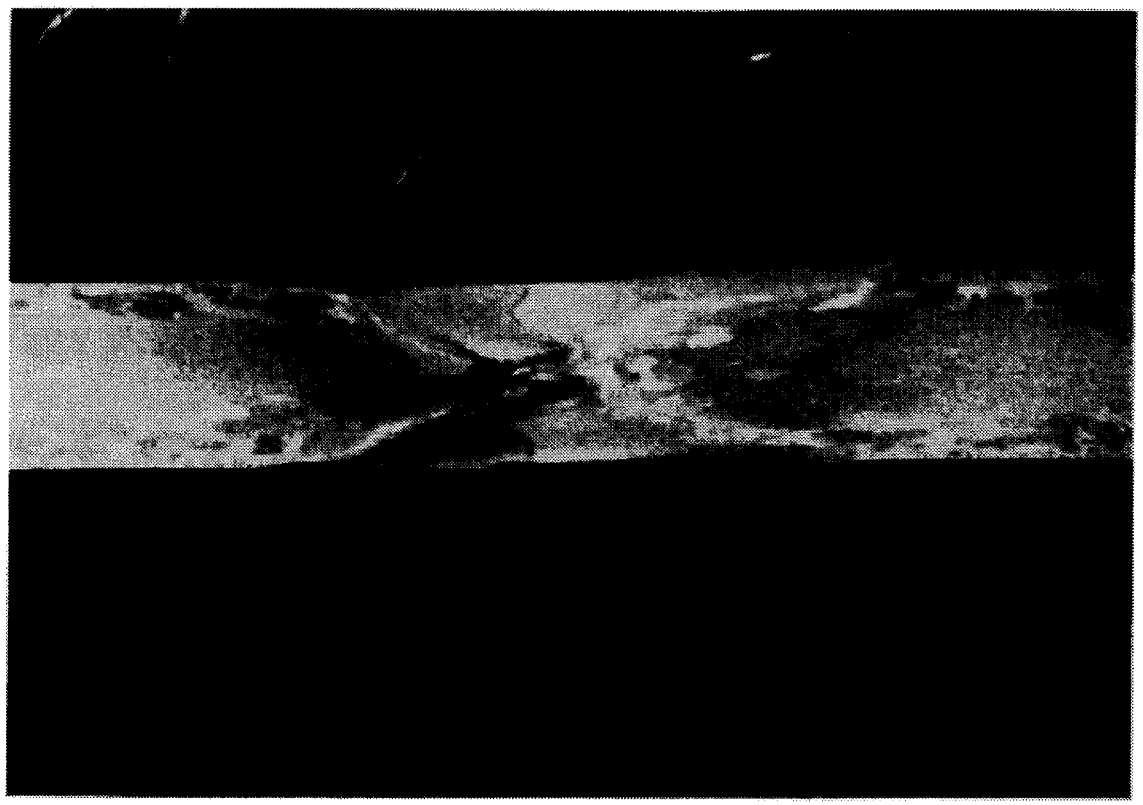
Figure 15:
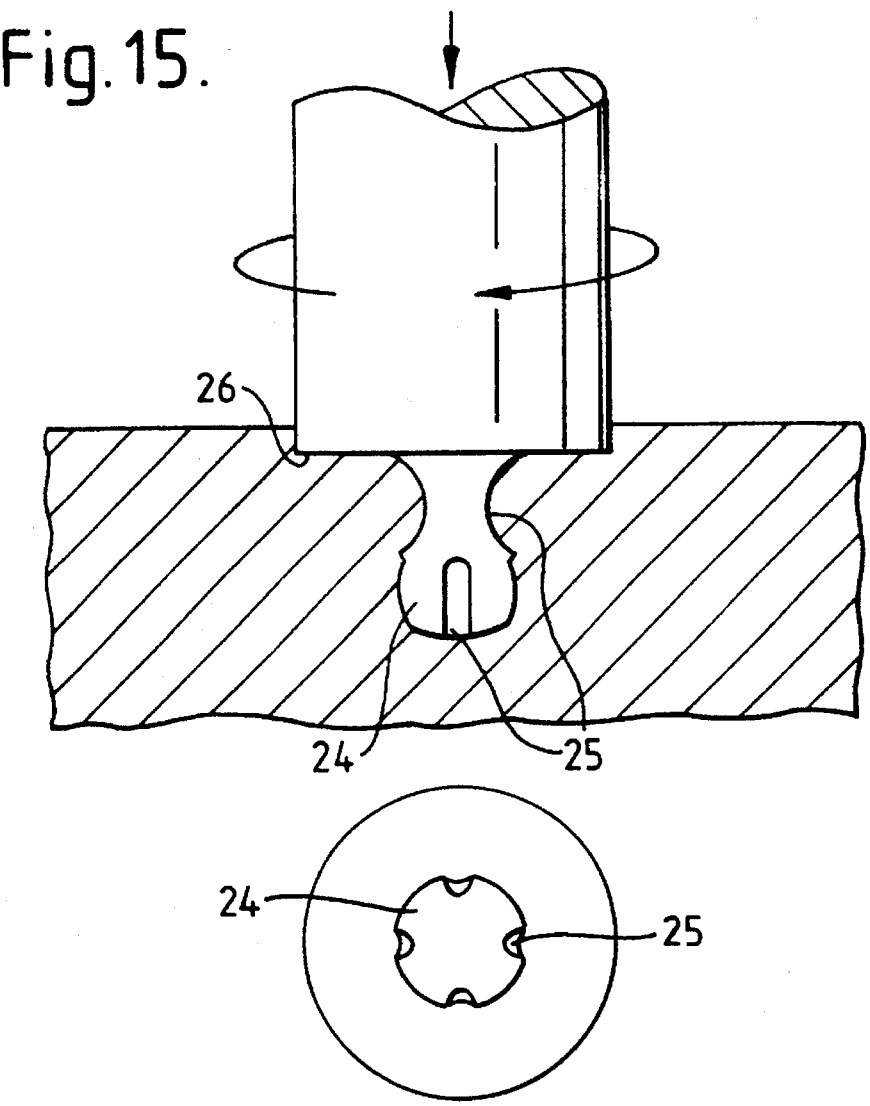
Figure 16:
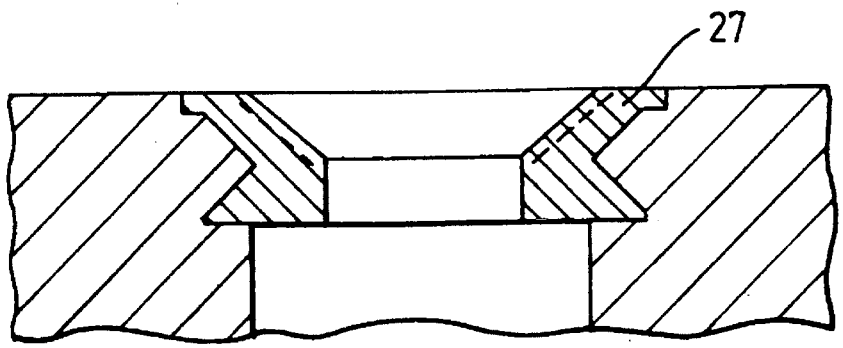

FIGS. 6a, b & c are examples of blades used in reciprocating motion;

FIG. 7 is a cross section (X7.5) through a butt joint in 6 mm thick amorphous thermoplastic material made using the method of FIG. 5;

FIG. 8 is a cross section through a butt joint in 6 mm thick semi-crystalline thermoplastic material using the method of FIG. 5;

FIGS. 9a–9c are macro-sections showing a 12 mm thick overlapped (i.e. two 6 mm thick sheets) amorphous thermoplastic material, a reciprocating motion multiple butt joint in amorphous thermoplastic material, and a reciprocating motion butt joint in 6.6 mm glass fiber reinforced material respectively;

FIGS. 10a, b, c, d, e & f are various sections showing three arrangements of an overlap joint, a butt joint in thick PVC, a multiple butt joint with at least one transparent thermoplastic material and a butt joint in a glass fiber reinforced thermoplastic material respectively using the method of FIG. 5;

FIG. 11 is an isometric view of a variation of the method of FIG. 5 for making a scarf joint;

FIGS. 12a, b & c are an isometric view, end view and plan respectively of a third example;

FIGS. 13a, b, and c show various examples of probe shape for use with the method of FIG. 12;

FIGS. 14a and 14b are a schematic view of a further process and a macro-section (x4) of an arrangement with two passes above and below the plates;

FIG. 15 illustrates an extension of the method of FIG. 12 in which the probe is inserted and entrapped in the parent material; and, FIG. 16 shows an example of a probe adapted as insert bush or stud according to the method of FIG. 15.

Figure 1:
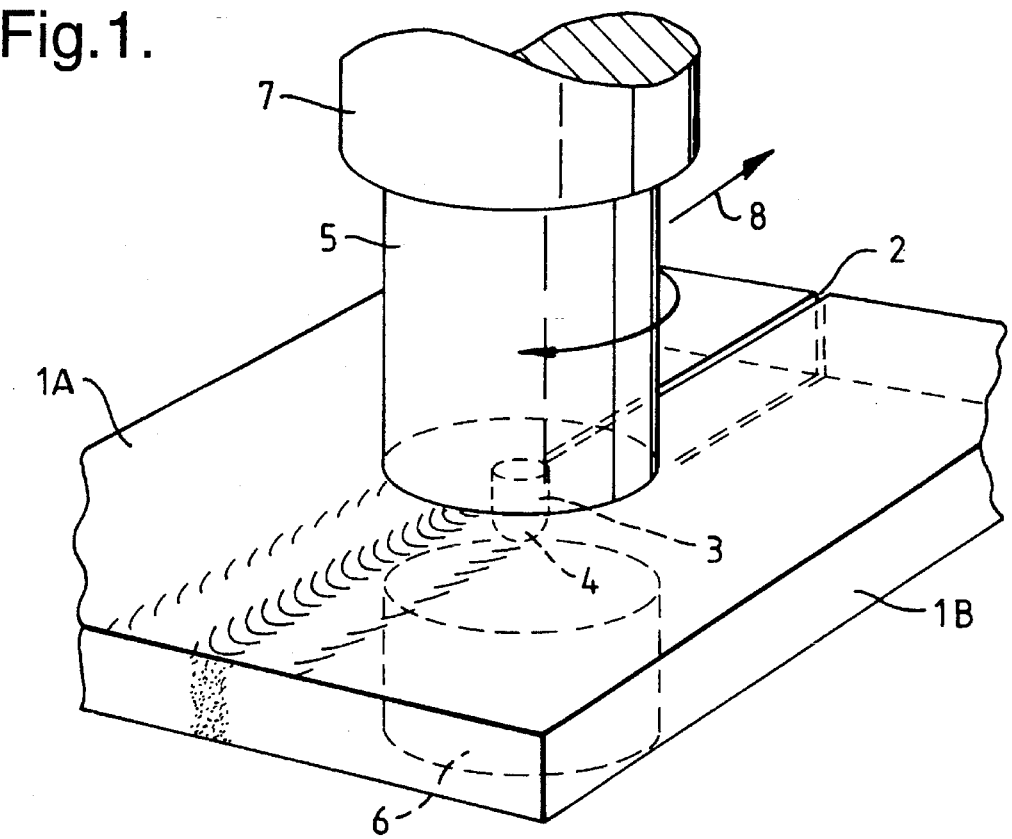
FIG. 1 is an isometric view illustrating one method.

In the example shown in FIG. 1, a pair of aluminium alloy plates 1A, 1B are butted together about a joint line 2. A non-consumable probe 3 of steel having a narrow central, cylindrical portion 4 positioned between upper and lower sections 5, 6 is brought to the edge of the joint line 2 between the plates 1A, 1B. The probe 3 is rotated by a motor 7 while the probe is traversed in a direction 8 and while the plates are held against lateral movement away from the probe 3. The rotating probe 3 produces a local region of highly plasticised material around the steel "pencil" portion 4 while top and bottom constraint is provided by the sections 5, 6.

It should be noted that the constraining faces of the sections 5, 6 are close fitting onto the sheets 1A, 1B to be joined to avoid loss of material from the plasticised zone. The rotating member 3 or the bobbin can be manufactured in one piece as shown in FIG. 2a, with a preset gap (typically 3.3 mm) between the faces 5A, 6A.

Figure 2A:
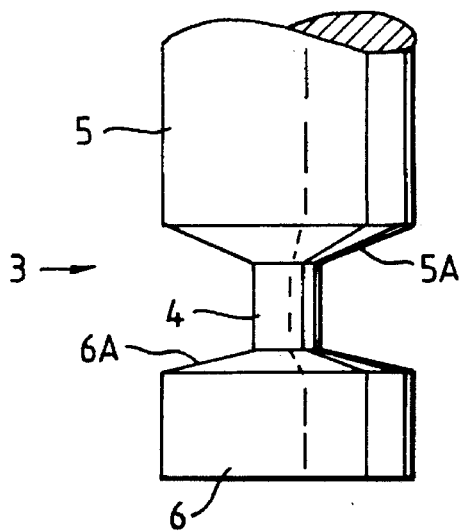
FIGS. 2a and 2b are side elevations of two different rotating members.
Figure 2B:
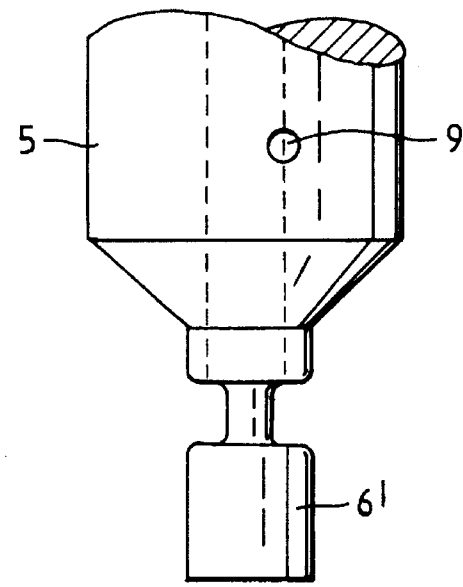

Alternatively, the bobbin may be demountable and the two parts 5, 6' secured, for example, by a cotter pin 9, as shown in FIG. 2b. For this it is convenient to drill a hole corresponding to the pin diameter in the butting sheets to be joined and the two parts 5, 6' of the bobbin brought together firmly onto the sheets before securing. Furthermore, the gap may be made adjustable over a short distance by a suitable cam lever or eccentric (not shown) to allow for variation in the thickness of the sheets to be joined from nominal values. Yet again, the component parts of the bobbin may be suitably spring-loaded so that a tight fit is maintained in spite of small variation in the sheet thickness. In all cases to avoid pre-drilling a suitable hole in the butting sheets to be joined, a suitable run-on (and run-off) tab can be utilised. For example, a split piece of similar material to that being joined can be fastened around the pin of the rotating member and pressed against the starting edge of the sheets to be joined, so that as plasticised material is formed there is minimum space for escape and a uniform zone is formed throughout the length of the seam to be joined.

The butting faces 5A, 6A of the bobbin may be machined substantially square but preferably are provided with a slight chamfer on the outer edges (FIG. 2a). In use it can be observed whether the top and bottom faces are in good contact with the materials to be joined by the visibly polished zone corresponding in width to the diameter of the faces up to the chamfer. Alternatively, and particularly for the spring loaded version, the face can be slightly domed with a radius of the order of 0.1 m or greater, such that a contact zone corresponding to the applied spring load is developed of sufficient width. Preferably the width of this contact zone should be at least 50% greater than the diameter of the pin generating plasticised material.

With suitable bobbins as described the rotating member can be driven via a spline such that it floats according to the materials being joined. With pre-machined components in a suitable jig then a floating head is not necessary and a preset bobbin can be used.

Figure 3:
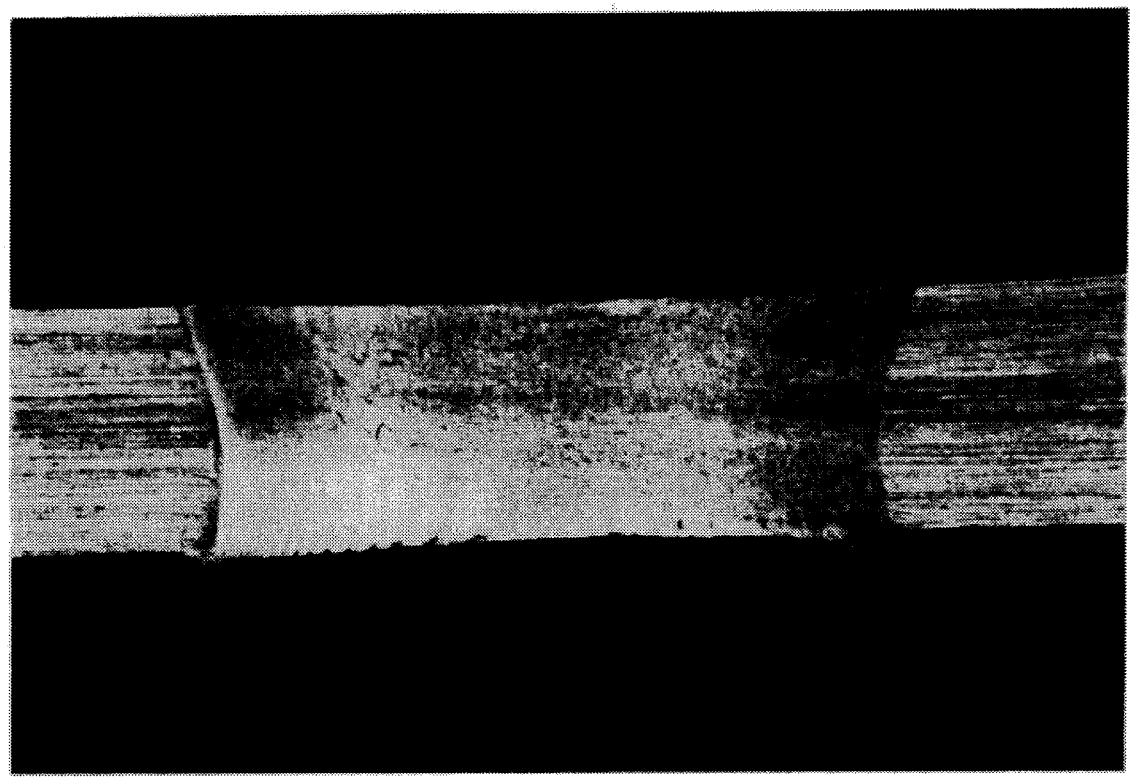
FIG. 3 is a macro-section through a joint in aluminium alloy using the method of FIG. 1.

A joint via the above method using a two part bobbin is shown in FIG. 3 for an aluminum silicon magnesium alloy (BS6082), nominally 3.2 mm thick. The overall width of the heat affected zone is approximately 9 mm corresponding to the contact zone on a chamfered bobbin. For this a 6 mm diameter pin was rotated at 1500 rpm (peripheral speed of approximately 0.47 m/sec) and traversed along the joint line at 370 mm per minute. It should be noted that the contact faces of the bobbin contribute to the heat input as well as the heating provided by the rotating pin and corresponding plasticised zone. For lower rotational rates the travel rate is also reduced, such as at 800 rpm, a suitable travel speed is 190 mm per minute. Excess travel speed leads to void formation or lack of consolidation of the plasticised material.

Figure 4:
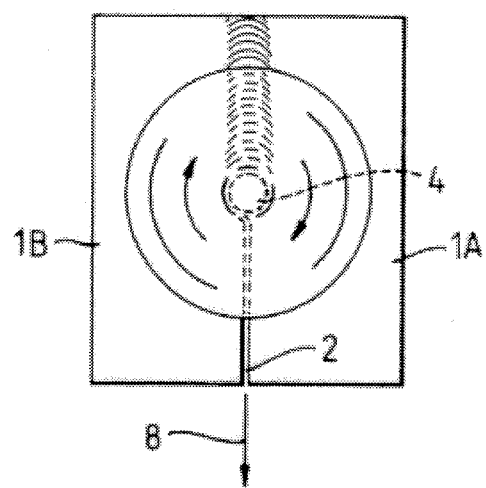
FIG. 4 is a plan illustrating the flow of plasticised material and surface marking with respect to the joint line.

As illustrated in FIG. 4, the plasticised material is swept around the rotating probe 4 such that voids, if any, tend to form on the side where the rotating surface is moving in the same direction as the travel along the joint (advancing edge). It appears there is no difficulty in obtaining complete consolidation with the plasticised material filling the joint zone in other regions, particularly on the side where the rotating surface is against the direction of travel of the bobbin through the material (retreating edge).

FIG. 5 shows a further method according to the invention by which the heating is obtained from a reciprocating blade 11 about which plasticised material is formed, and which is passed along the joint line 2. As previously the mechanical motion generates frictional heat in the plasticised material which, with traverse, flows from the leading to the trailing edges of the blade 11 and on cooling completes the butt joint between the materials to be joined. The blade 11 can be reciprocated from one side only or between two synchronized heads on either side of the materials. For making the butt joint, the sheets 1A, 1B are placed in contact but generally without an abutment load prior to traversing the blade 11 along the joint line. If necessary guard plates can be mounted above and below the materials to be joined to prevent excessive displacement of plasticised material out of the joint zone. Also for some materials a degree of pre-heating the blade 11, eg., by passing an electric current down the length of the blade can add to the heating due to rapid mechanical shear in the plasticised zone.

Although a simple thin rectangular blade 11 can in principle be used, it is preferable for the reciprocating blade to be shaped in cross section and in particular to have a relatively narrow wedge shaped trailing edge. A double wedge profile is shown in FIG. 6a where the overall length in the direction of travel is preferably between 5 and 15 times the width. The width should be as small as convenient, such as around 1 mm, and the blade made of material which is sufficiently strong at the melting point temperatures of the thermoplastic, ie., at temperatures between 250° and 300° C. to withstand the mechanical forces and in particular to not buckle. For example tool steel or other hard steel can be ground into the shape desired and the surface polished to give a fine finish. Where desirable, the blade can pass through guard plates to prevent excessive plasticised material being taken out of the joint zone, and these guard plates may also be made of tool steel and lined with a low frictional resistance material such as PTFE. The double wedge shape is particularly useful for moving in either direction along the common joint line.

Figure 6B:
Figure 6C:
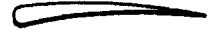

A single ended wedge is shown in FIG. 6b where preferably the overall length is between 3 and 10 times the width and the leading edge is rounded. This shape is used with the rounded end in the direction of travel along a straight joint line and can also be used for joining along a curved line of relatively large radius. A further arrangement for curved joints is shown in FIG. 6c, where the trailing edge is curved in section to correspond approximately with the curvature of the joint line.

For the reciprocating blades the displacement is preferably equal to or less than half the overall thickness of the material being joined, ie., ±3 mm or less for 6 mm sheet and so forth. Greater strokes lead to excessive loss of material from the joint and consequent voids or porosity. It is noted that the plasticised material tends to cling to the blade and is pulled and pushed with reciprocating motion in the through thickness direction. Operating conditions are chosen such that the build up of plasticised material on the blade is avoided or minimised.

The frequency of reciprocating motion depends partly on the amplitude, and partly on the material being joined. Preferably the maximum (sinusoidal) velocity in the mid stroke position is in the region of 0.5 m/sec to 5 m/sec. For materials such as polyethylene and PVC the preferred velocities are in the range of 0.75 meter per second to 4.5 meters per second. The higher velocities lead to greater heating and in the limit to degradation of the thermoplastic material.

To assist in initiation of the seam the reciprocating blade 11 can be pre-heated prior to the frictional operation. Any convenient method can be used ie., Joule heating of the blade, or heating by hot gases, or maintaining the blade in a pre-heated sheath prior to use. Where advantageous the blade may also be electrically heated in use as well as developing thermal energy through mechanical work.

A typical joint in an amorphous thermoplastic material—white polyethylene—is shown in FIG. 7 for 6 mm thick material. For this the blade stroke was approximately ± 3 mm at around 47 Hz giving a maximum sinusoidal mid stroke speed of 0.88 meter per second. The butt joint is completed at a rate of 30 mm per minute giving an overall joint completion rate (depth and length per unit time) of 3 $mm^2$ per second. It should be noted that this greatly exceeds that possible with the hot gas welding technique which is commonly used, and which for this thickness would require several passes. A simple tensile test across the butt joint as-welded shows a strength well in excess of 50% of the parent material alone. It is also noted that the joint is virtually free from pores or flat spot areas and provides a narrow bead on the top and bottom surfaces of the butt joint. The bead profile does not exhibit the central re-entrant angle commonly found in thermoplastic materials joined by the hot butt techniques.

A typical butt joint in a semi-crystalline material—clear PVC—is shown in FIG. 8 for 6 mm thick sheet joined under similar conditions to that for the polyethylene material with a travel rate of 30 mm per minute. Again a simple tensile test shows strength above 50% of parent material alone with a good profile with top and bottom beads. The section FIG. 8 shows the flow lines of the heat affected material, as well as the zone where the plasticised material has formed the joint. Higher travel speeds can be used but speeds in excess of 90 mm per minute lead to the occurrence of voids or other porosity in the joint.

Various examples of different joints in thermoplastic material using a reciprocating blade is shown in FIG. 10. A simple seal between overlapping sheets is shown in FIG. 10a, the solid line 12 indicating the line along which the probe or blade extends. This method may also be adapted as sketched in FIG. 10b and c, for the joining of two sheets of similar thickness. FIG. 9a shows a real joint similar to FIG. 10a between two sheets of clear PVC 6 mm thick with the same operating conditions as for FIG. 7 of stroke ± 3 mm and frequency around 47 Hz. The travel rate used was still 30 mm per minute in spite of the double thickness 12 mm total.

Figure 10D:
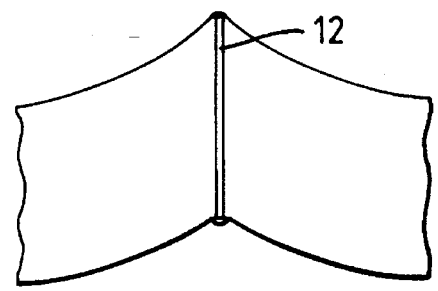
Figure 10E:
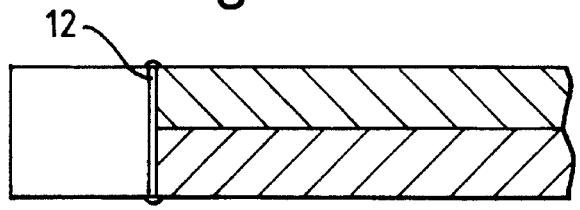

Another arrangement suitable for the joining or sealing is shown in FIG. 10e where two 3 mm sheets are joined to one 6 mm thick sheet in a butt configuration. A clear plastic such as clear PVC enables the joint to be inspected for quality. This is shown in macrosection in FIG. 9b. A further joint is shown in FIG. 10d where for thick plate the ends have been upset to give an extended joint area. For this the stroke may be for example ±13 mm at a frequency of around 53 Hz giving a maximum velocity of around 4.3 meters per second. With a travel speed of 40 mm per minute the overall joining rate is around 20 $mm^2$ per second of butting section.

Figure 10F:
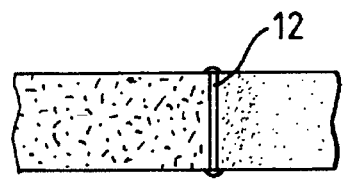

Finally, FIG. 10f (and FIG. 9c) shows a joint between fiber reinforced polyethylene with a 20% by weight inclusion of short glass fibers. Conditions similar to those used for FIG. 7 were employed with 30 mm per minute travel rate for material 6.5 mm thick. A joint strength in the order of 50% of the parent material or about 80% of the plain un-reinforced polyethylene was obtained.

It should be noted that these nominal tensile strengths are for as-welded specimens and that with further combinations of parameters to provide an optimum result strengths approaching that of a parent material should be obtainable.

An alternative approach to increase the effective joint strength is shown in FIG. 11 where with the same reciprocating blade 11 a scarf joint is made between two abutting sheets 13, 14 having sloped edges 13A, 14A defining a joint region 15. This arrangement also allows the two sheets 13, 14 to be held in position via rollers 16, 17 and any tendency to pull apart restrained.

It should be noted that the end load in the direction of travel of the reciprocating blade 11 under suitable joining conditions is relatively low and only a simple traverse mechanism is required to maintain uniform motion.

Alternatively and particularly for thin sheet below 10 mm, it is possible to use a hand tool similar to a conventional jig saw for achieving the joint between butting or overlapping plastic materials. For curved joint lines a relatively thin blade of small longitudinal dimension such as 1 mm×4 mm of the general shape shown in FIG. 6c is desirable. Such hand tools can also be fitted with caterpillar type crawler tracks to maintain a uniform forward velocity. The tracks may be made with rubber impregnated track faces or partially evacuated to improve traction and adherence to the surface of the plastic material.

In the example of FIG. 12 the non-consumable member has a slightly tapered cylindrical probe 18 at its leading end, which is pressed against and becomes inserted between the plates 1A, 1B, but does not extend completely through the thickness of the materials being joined as shown in FIG. 12b. The surface appearance of the plates after the butt welding operation is shown in FIG. 12c for the upper surface.

Figure 13B:
Figure 13C:
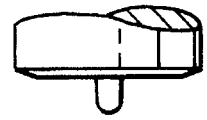

The shape of the probe is important. A simple conical point (FIG. 13a) enables the probe to enter the plates butted together relatively easily but results in a narrowing of the plasticised region near the apex of the probe. Alternatively, a truncated cone, such as shown in. FIG. 13b, requires preferably a pre-drilled depression in the butting sheets to be joined. Preferably the probe is of a slightly tapered cylindrical form with a blunt nose, as shown in FIG. 13c. This enables the probe to be pressed against the sheets so that it becomes inserted forming a plasticised zone around the probe which travels along the joint seam as previously described.

For a joint between aluminium alloy plates 6 mm thick made by the method illustrated in FIG. 12, the probe may be rotated at 850 rpm and traversed along the joint line at 240 mm per minute. Higher rotational speeds, such as 1000 rpm, enable greater travel rates to be used up to say 300 mm per second, but increasing the travel rate excessively leads to the formation of pores along one side as was found with the parallel sided arrangement of FIG. 1. Alternatively, the rotational speed can be reduced such as down to 300 rpm with a corresponding reduction in travel rate. For a given travel speed there is a reasonable tolerance in rotational rates such as at 4 mm per second (240 mm per minute) for the aluminum silicon magnesium alloy (BS6082) satisfactory results are obtained for rotational speeds between 440 and 850 rpm.

FIG. 14a illustrates a further example in which a pair of non-consumable members 20, 21 similar to the member 18 are provided on opposite sides of the plates 1A, 1B. The members 20, 21 will be urged towards each other, but are displaced in the direction of travel such that the plates are clamped together in position, but not sufficiently to cause excessive heating at the interface between the outwardly facing surfaces of the plates and the non-consumable members. Alternatively, the method of FIG. 12 can be carried out as separate operations on each side of the plates being joined. An example of double sided weld according to the above is shown in FIG. 14b for the same aluminum silicon magnesium alloy. The operating conditions were 240 mm per minute travel at 850 rpm for each side.

The contact face 22 of each single ended probe can be substantially square or preferably with a small chamfer to relieve the outer edge. The appropriate load or positioning of the rotating probe is then given by the appearance of the plate surface which should show that the face is in contact from the wide but thin layer of disturbed material. Alternatively, the face of the rotating member can be slightly domed as for the face of the bobbin in FIG. 2, such that at a given load the surface contact area expands to at least 50% greater than the diameter of the probe itself. Contact zones up to three times probe diameter have been found satisfactory. For thinner materials it is preferable to scale the probe such that, for example it is reduced to 4 or 3 mm. Unexpectedly the preferred rotational speed is also reduced together with the travel rate for a smaller diameter probe. For example with a 3.3 mm diameter probe a rotational speed of 440 rpm and 120 mm per minute travel is satisfactory.

In all these cases the slight taper of the probe face 22 amounts to around 2°.

The method described with respect to FIGS. 1, 5 and 12 can be applied to the joining together of the abutting faces of a crack in a given material or component. The crack may be in the full thickness, or only partially penetrating the thickness, and may lie in parent material, or a heat affected zone in the material, such as adjacent to a weld or in a weld itself. The method of FIG. 12 is generally suitable for a partially penetrating crack, although in principle a fully penetrating method such as that shown in FIG. 5 could also be utilised. The technique is essentially similar to that already described, where preferably the probe is inserted into the parent material (to the depth of the crack at least) before passing along the crack interface, to generate plasticised material by frictional heating which on cooling consolidates the material where the crack previously existed. The end of the crack in the direction of travel can be consolidated in various ways. For example the probe can be left in-situ or, alternatively, a pass made in the reverse direction and overlapped with the initial pass so that the termination of the reverse pass lies in a region away from the original crack site.

A similar technique for making a local joint or weld but without traversing the tool for generating frictional heating can be utilised for a probe applied to one-side of the material. Here for example the plasticised material formed is utilised to stitch together two components at discrete intervals along their common interface. In like manner a crack can be held together by local plasticised material at one or more regions along its length. In these examples the probe can be left in-situ surrounded by the plasticised material so formed. Preferably in this arrangement the probe can be in a collet with a suitable end face to help prevent excessive dispersal of the plasticised material displaced by the probe.

Furthermore as illustrated in FIG. 15, a probe 24 for forming a local plasticised zone in a single locality can have re-entrant regions 25 such that on inserting the probe into the material the plasticised material flows into the re-entrant regions. On cooling the probe is entrapped by the material, apart from any metallurgical bond between the probe material and the surrounding plasticised material. Preferably the probe is supported by a shoulder 26 as in the arrangements of FIG. 12 and 13 to provide further heating and to prevent excessive dispersal of the plasticised material being formed.

The above technique may also be utilised for inserting and entrapping probes of harder/stronger material into a softer/weaker material to act as fixtures for attaching other components to the weaker material. An example is shown in FIG. 16 of such a probe 27 adapted as a stud or bush for insertion, which is stronger or more durable than the parent material.

These and other variations of the method according to the invention in which plasticised material is generated by frictional shear from a separate component inserted into the parent material and which on cooling consolidates the material or surrounds the component to restrain it in the material is within the scope of this invention.

In all these examples, the result of the welding operation is an extremely smooth finish on the surfaces of the plates which is a particular advantage of this process. This can be improved by providing Ferodo brake material on the facing surface of the non-consumable probe. Typically the rotational speed of the non-consumable will be between 300 and 600 rpm and the traverse rate of the work piece is in the range of 1 to 6 mm/sec. Typically, the non-consumable will be made of an alloy steel.

Specimens have been produced and subjected to mechanical tensile and hammer bend tests as well as metallurgical evaluation which have demonstrated the practicability of the process.

The advantages of the process can be summarised as follows:

Non-consumable technique
Continuous—unlimited length
No preparation
Reasonable smooth finish
Good mechanical properties
Solid phase,
Low distortion
Limited axial load ie. no axial feed only light contact
Key hole technique
Portable equipment KAT driven
Joint can be produced from one side
Simple to use
Low cost capital equipment
Fast freeze 5G position
Examples of applications of the technique include:
Autogenous key hole technique, Plate fabrication in hip building, Pipe butt welding, Aluminum Armour plate, Pipe seam, Fracture repair, Plastic welding, and fabrication of joists etc.

We claim:

1. A method of operating on a workpiece, the method comprising offering a probe of material harder than the workpiece material to a continuous or substantially continuous surface of the workpiece; causing relative cyclic movement between the probe and the workpiece while urging the probe and workpiece together whereby frictional heat is generated as the probe enters the workpiece so as to create a plasticised region in the workpiece material around the probe; stopping the relative cyclic movement; and allowing the plasticised material to solidify around the probe.

2. A method according to claim 1, wherein at least part of the probe which enters the workpiece is shaped so as to key into the solidified material.

3. A method according to claim 2, wherein the probe tapers outwardly in a direction towards the workpiece.

4. A method of joining workpieces defining a joint region therebetween, the method comprising causing a probe of material harder than the workpiece material to enter the joint region and opposed portions of the workpieces on either side of the joint region while causing relative cyclic movement between the probe and the workpieces whereby frictional heat is generated to cause the opposed portions to take up a plasticised condition; removing the probe; and allowing the plasticised portions to solidify and join the workpieces together.

5. A method according to claim 4, wherein the joint region has an elongate dimension extending laterally between the workpieces, the method further comprising causing relative translational movement between the workpieces and the probe in the direction of the joint region.

6. A method according to claim 4, wherein the probe extends through the thickness of the workpieces.

7. A method according to claim 4, wherein the probe has an elongate axis which substantially intersects the joint region and extends substantially parallel with the sides of the workpiece defining the joint region.

8. A method according to claim 4, wherein the probe defines an elongate axis which extends in a direction substantially transverse to a plane parallel with the joint region.

9. A method according to claim 4, wherein the workpieces comprise separate members.

10. A method according to claim 4, wherein the probe has an elongate axis and undergoes cyclic movement in a direction generally parallel with its elongate axis.

11. A method according to claim 10, wherein the cyclic movement is a reciprocating movement.

12. A method according to claim 4, wherein a cross-section through the probe is substantially circular.

* * * * *

REEXAMINATION CERTIFICATE (3395th)
United States Patent [19]
Thomas et al.

[11] B1 5,460,317
[45] Certificate Issued Dec. 9, 1997

[54] FRICTION WELDING

[75] Inventors: Wayne M. Thomas; Edward D. Nicholas, both of Haverhill; James C. Needham, Saffron Walden; Michael G. Murch, Herts; Peter Temple-Smith, Cambridge; Christopher J. Dawes, Cambs, all of United Kingdom

[73] Assignee: The Welding Institute, Cambridge, United Kingdom

Reexamination Request:
No. 90/004,399, Oct. 2, 1996

Reexamination Certificate for:
Patent No.: 5,460,317
Issued: Oct. 24, 1995
Appl. No.: 244,612
Filed: Aug. 1, 1994

[22] PCT Filed: Nov. 27, 1992
[86] PCT No.: PCT/GB92/02203
§ 371 Date: Aug. 1, 1994
§ 102(e) Date: Aug. 1, 1994
[87] PCT Pub. No.: WO93/10935
PCT Pub. Date: Jun. 10, 1993

[30] Foreign Application Priority Data

Dec. 6, 1991 [GB] United Kingdom ............ 9125978

[51] Int. Cl.$^6$ .................................... B23K 20/12
[52] U.S. Cl. .................... 228/112.1; 228/2.1
[58] Field of Search .................... 228/112.1, 114.5, 228/114, 119, 189, 234.1, 2.1; 156/73.5

[56] References Cited

U.S. PATENT DOCUMENTS 4,260,094  4/1981  Stroo ................................ 228/112.1

FOREIGN PATENT DOCUMENTS 26 56 017  6/1978  Germany ......................... 156/73.5
001393567  5/1988  U.S.S.R. ........................... 228/2.3
1 567 135  5/1980  United Kingdom .......... 228/112.1

OTHER PUBLICATIONS

P. Drews et al., "The Connecting of CrNi–Steel To Aluminum and AL Alloys by the Friction Welding Process", Industrie–Anzeiger Schweiss–und Schneidtechnik, May 26, 1970, (in German, with English translation and Declaration of translator).

S. Elliott et al., "Joining Aluminium To Steel—A review Of Mechanisms And Techniques In Friction Welding And Diffusion Bonding", The Welding Institute, Jun., 1979 (pp. 1–26, and Figures).

*Primary Examiner*—Samuel M. Heinrich

[57] ABSTRACT

A method of operating on a workpiece comprises offering a probe of material harder than the workpiece material to a continuous surface of the workpiece causing relative cyclic movement between the probe and the workpiece while urging the probe and workpiece together whereby frictional heat is generated as the probe enters the workpiece so as to create a plasticized region in the workpiece material around the probe, stopping the relative cyclic movement, and allowing the plasticized material to solidify around the probe. This technique, which we refer to as "friction plunge welding" provides a very simple method of joining a probe to a workpiece. The method can be used for repairing cracks and the like within a workpiece or for joining members, such as studs or bushes, to a workpiece. Another aspect of the invention comprises causing a robe of material harder than the workpiece material to enter the joint region and opposed portions of the workpieces on either side of the joint region while causing relative cyclic movement between the probe and the workpieces whereby frictional heat is generated to cause the opposed portions to take up a plasticized condition, removing the probe, and allowing the plasticized portions to solidify and join the workpieces together. This technique, which we refer to as "friction stir butt welding" enables a wide variety of workpieces to be joined using a "non-consumable" probe without the problems of oxidation and the like.

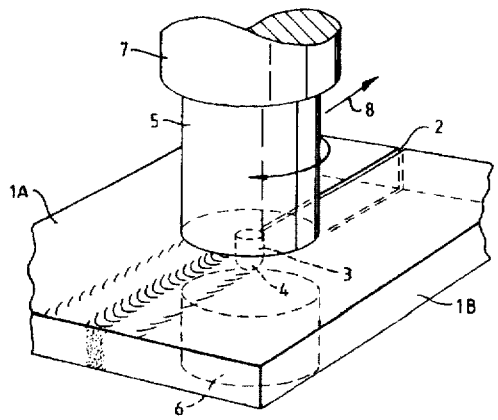

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–4 are cancelled.

Claims 5–10 and 12 are determined to be patentable as amended.

Claim 11, dependent on an amended claim, is determined to be patentable.

New claims 13 and 14 are added and determined to be patentable.

5. A method according to claim 4, wherein the joint region has an elongate dimension extending laterally between the workpieces, the method further comprising causing relative translational movement between the workpieces and the probe in the direction of the joint region, *and wherein the steps of the method are carried out without causing relative bodily movement between the workpieces.*

6. A method according to claim [4] *5*, wherein the probe extends through the thickness of the workpieces.

7. A method according to claim [4] *5*, wherein the probe has an elongate axis which substantially intersects the joint region and extends substantially parallel with the sides of the workpiece defining the joint region.

8. A method according to claim [4] *5*, wherein the probe defines an elongate axis which extends in a direction substantially transverse to a plane parallel with the joint region.

9. A method according to claim [4] *5*, wherein the workpieces comprise separate members.

10. A method according to claim [4] *5*, wherein the probe has an elongate axis and undergoes cyclic movement in a direction generally parallel with its elongate axis.

12. A method according to claim [4] *5*, wherein a cross-section through the probe is substantially circular.

*13. A method according to any of claims 5–12, wherein the steps of the method are carried out while the workpieces are butted together in the joint region.*

*14. A method according to claim 4, wherein the probe has an elongate axis and undergoes reciprocating movement in a direction generally parallel with its elongate axis.*

* * * * *